United States Patent
Miura (10) Patent No.: US 9,889,601 B2
(45) Date of Patent: Feb. 13, 2018

(54) PARTIAL VACUUM FORMING METHOD BY PARTIAL OVERLAY OF DECORATIVE FILM

(71) Applicant: Fu-se Vacuum Forming Co., Ltd., Habikino-shi, Osaka (JP)

(72) Inventor: Takayuki Miura, Habikino (JP)

(73) Assignee: FU-SE VACUUM FORMING CO., LTD., Osaka (JP)

( * ) Notice: Subject to any disclaimer, the term of this patent is extended or adjusted under 35 U.S.C. 154(b) by 521 days.

(21) Appl. No.: 14/411,004

(22) PCT Filed: Jun. 17, 2014

(86) PCT No.: PCT/JP2014/065959
§ 371 (c)(1),
(2) Date: Dec. 23, 2014

(87) PCT Pub. No.: WO2015/019712
PCT Pub. Date: Feb. 12, 2015

(65) Prior Publication Data
US 2016/0271867 A1      Sep. 22, 2016

(30) Foreign Application Priority Data

Aug. 5, 2013 (JP) ................................ 2013-161935

(51) Int. Cl.
  *B29C 65/00*      (2006.01)
  *B29C 63/00*      (2006.01)
  (Continued)

(52) U.S. Cl.
  CPC ........ *B29C 66/00145* (2013.01); *B29C 51/10* (2013.01); *B29C 51/16* (2013.01);
  (Continued)

(58) Field of Classification Search
  CPC ....... B29C 51/10; B29C 51/261; B29C 59/06; B29C 2063/028; B29C 33/301;
  (Continued)

(56) References Cited

U.S. PATENT DOCUMENTS 5,127,974 A * 7/1992 Tomiyama .............. B29C 51/16
                                                          150/166
5,997,670 A * 12/1999 Walker ................ B29C 63/0056
                                                          150/166
(Continued)

FOREIGN PATENT DOCUMENTS

JP     62-112941 U     7/1987
JP     8-183090 A      7/1996
(Continued)

OTHER PUBLICATIONS

International Search Report for the Application No. PCT/JP2014/065959 dated Jul. 15, 2014.

(Continued)

*Primary Examiner* — Matthew J Daniels
*Assistant Examiner* — Marta S Dulko
(74) *Attorney, Agent, or Firm* — Cheng Law Group, PLLC (57) ABSTRACT

An upper opening accommodating chamber and a lower opening upper box are joined vertically together with a decorative film sandwiched therebetween to sealingly form a forming space in which the accommodating spaces and are coupled together, and each of the upper and the lower spaces of the forming space is pressure-controlled to bring, under reduced pressure, the decorative film into close contact with a surface of a part of the adherend accommodated in the forming space. The accommodating chamber includes a recessed receiving jig enclosing a predetermined forming portion of the entire adherend from the inside of the portion (Continued)

to a side periphery, and only the portion surrounded by the receiving jig is partially vacuum formed.

4 Claims, 4 Drawing Sheets

(51) Int. Cl.
| | |
|---|---|
| *B29C 63/02* | (2006.01) |
| *B29C 65/14* | (2006.01) |
| *B29C 51/10* | (2006.01) |
| *B29C 51/16* | (2006.01) |
| *B29C 51/26* | (2006.01) |
| *B29C 51/30* | (2006.01) |
| *B29L 31/30* | (2006.01) |
| *B29L 31/00* | (2006.01) |

(52) U.S. Cl.
CPC .......... *B29C 51/262* (2013.01); *B29C 51/303* (2013.01); *B29C 63/0065* (2013.01); *B29C 63/0091* (2013.01); *B29C 63/02* (2013.01); *B29C 65/1412* (2013.01); *B29C 66/43* (2013.01); *B29C 2791/006* (2013.01); *B29L 2031/3005* (2013.01); *B29L 2031/722* (2013.01)

(58) Field of Classification Search
CPC ..... B29C 33/0044; B29C 51/20; B29C 51/36; B29C 51/303; B29C 67/0092; B29C 63/024; B29C 63/0073; B29C 63/0078; B29C 66/49; B29C 66/816; B29L 2031/3005; B25H 3/04; B65G 2201/0294; B28B 7/285
See application file for complete search history.

(56) References Cited

U.S. PATENT DOCUMENTS

| | | | | |
|---|---|---|---|---|
| 6,257,866 | B1* | 7/2001 | Fritz | B29C 51/06 425/387.1 |
| 6,450,793 | B1* | 9/2002 | De Nichilo | B29C 51/427 264/544 |
| 6,488,068 | B2* | 12/2002 | Stone | B23P 19/047 156/574 |
| 6,514,371 | B2* | 2/2003 | Justin | B29C 63/02 156/229 |
| 6,699,346 | B1* | 3/2004 | Habisreitinger | B29C 63/02 156/212 |
| 7,293,976 | B2* | 11/2007 | La Sorda | B29C 51/261 425/340 |
| 8,096,338 | B2* | 1/2012 | Postill | B29C 63/0004 156/540 |
| 9,199,413 | B2* | 12/2015 | Furuya | B27D 1/083 |
| 2006/0038325 | A1* | 2/2006 | Ostrander | B29C 51/10 264/553 |
| 2006/0231981 | A1* | 10/2006 | Lee | B29C 33/307 264/320 |
| 2009/0065981 | A1* | 3/2009 | Polk, Jr. | B29C 43/021 264/553 |
| 2010/0102482 | A1* | 4/2010 | Jones | B29C 33/307 264/320 |
| 2010/0186639 | A1* | 7/2010 | Schiava | B29C 51/16 108/57.27 |
| 2013/0174396 | A1* | 7/2013 | Torres Martinez | B21D 53/92 29/33 R |
| 2014/0147630 | A1* | 5/2014 | Suzuki | B29C 51/16 428/141 |
| 2014/0204599 | A1* | 7/2014 | Miura | B60Q 1/2661 362/501 |

FOREIGN PATENT DOCUMENTS

| | | |
|---|---|---|
| JP | 10-34741 A | 2/1998 |
| JP | 2002-79573 A | 3/2002 |
| JP | 2003-89150 A | 3/2003 |

OTHER PUBLICATIONS

Notification of Reasons for Refusal for the Application No. 2013-161935 from Japan Patent Office dated Apr. 22, 2014.

* cited by examiner

PARTIAL VACUUM FORMING METHOD BY PARTIAL OVERLAY OF DECORATIVE FILM

TECHNICAL FIELD

The present invention relates to a vacuum forming machine for forming a sheet material by depositing the sheet material onto an adherend W under vacuum, a substrate for the vacuum forming machine used in a vacuum forming process using the machine, or a partial vacuum forming method using such a substrate for the vacuum forming machine, and the present invention particularly relates to a partial forming method for forming a particular part of the adherend W.

BACKGROUND ART

Conventionally, as a vacuum forming device hardly affected by outside air, one has been disclosed which has upper and lower chamber boxes in which a workpiece is formed. The upper and lower chamber boxes can be joined to and separated from each other, the upper chamber box includes a heater that heats the workpiece in the joined chamber boxes (refer to Patent Document 1).

According to the disclosure, the workpiece is heated by the heater in the joined chamber boxes and a near infrared heater is used as the beater, so that the workpiece is heated and formed in a closed space. Thus a vacuum forming device is provided which is hardly affected by outside air during forming compared with conventional devices.

PRIOR ART DOCUMENTS

Patent Document

Patent Document 1: JP 2002-079573 A

SUMMARY OF THE INVENTION

Problems to be Solved by the Invention

However, the conventional vacuum forming device requires a process for reducing pressure in the upper and lower boxes for vacuum forming. Accordingly, upon using a large adherend W, a large accommodating chamber 21 is necessary to accommodate the adherend. Therefore, a long vacuum suction time is required for reducing pressure in the large accommodating chamber 21, thus requiring an extended work time. Also, using a large vacuum suction pump increases costs. Overlay forming a film before reducing the pressure sufficiently by vacuum suction may result in insufficient adhesion of the film or lifting up of a decorative film F. Also, the large accommodating chamber 21 requires a long time for cooling down the decorative film F heated after being formed, preventing efficient vacuum forming.

Thus, the present invention aims to perform overlay forming of a film in a relatively short time even if a large adherend W is used in the partial vacuum forming method in which the decorative film F is brought into close contact with the upper accommodating chamber 21 and forming the film under reduced pressure.

Solutions to the Problems (1) The present invention provides a partial vacuum forming method by partial overlay of a decorative film F, the method including vertically joining an accommodating chamber 21 having an upper opening accommodating space S21 to an upper box 22 having a lower opening box space 22S with a decorative film F sized to cover the openings sandwiched therebetween to sealingly form a coupled space in which the upper and the lower box spaces S21 and 22S are coupled together; and pressure controlling each of the upper and the lower spaces of the coupled space to bring, under reduced pressure, the decorative film F into close contact with a surface of a part of an adherend W accommodated in a forming space.

The method includes:

a receiving jig (including a bottom frame plate 11 and a side frame plate 312) including a recessed body enclosing a predetermined forming portion WP of an entire adherend W from the inside of the portion to the side periphery, the receiving jig having a receiving mold with an upper end opening along an upper opening edge of an accommodating chamber 21;

the accommodating chamber 21 configured to, in a state where the adherend W is accommodated in the box space, position the receiving jig enclosing a part of the predetermined forming portion WP of the adherend W in proximity to the upper opening;

an upper box 22 positioned above a space above the accommodating chamber 21 so as to be movable upward and downward, and in its downward-most position, the upper box being assembled by bringing a lower opening of the box space into contact with the upper opening of the accommodating chamber 21 with a decorative film F sandwiched therebetween; and pressure controlling means pressure controlling the upper space 22S in the upper box 22 and a lower space 11S in the receiving jig positioned and fixed in the accommodating chamber 21.

The method includes:

positioning the upper end of the receiving mold of the receiving jig enclosing the part of the adherend W is positioned in proximity to the upper opening in the accommodating chamber 21, to partition the accommodating chamber 21 into the lower space 11S in the receiving jig and the accommodating space 21S;

sealingly and vertically coupling together the partitioned lower space 11S11S in the receiving jig and the upper space 22S in the upper box 22 with the decorative film F sandwiched therebetween;

pressure releasing each of the space in the body 11S and the upper space 22S that are sealed together are pressure reduced, and then only the upper space 22S; and thus, overlay forming the decorative film F on the part of the adherend W enclosed by the receiving jig.

Since only a part, not all, of the entire adherend W is surrounded and decoratively formed, only the forming portion WP to be decorated is surrounded for vacuum forming regardless of the shape and the size of a component of the adherend, leading to significant reduction in vacuum forming time. Also, partially overlay forming the decorative film F instead of performing plating or coating significantly improves the working environment.

(2) Preferably, the receiving jig can be assembled from the bottom frame plate 11 that can be inserted through a plurality of opening shaping parts WH of the adherend W and the side frame plate 312 joined to surround four sides of the bottom frame plate 11, and each face of the side frame plate 312 is joined to a side of the bottom frame plate 11 inserted through the opening shaping parts of the adherend W, thereby achieving the second set state (SB1) where the receiving jig encloses the predetermined forming portion WP of the adherend W from the inside of the adherend W and the forming mold 12 comes into contact with the rear side of the predetermined forming portion WP. Since the receiving jig is structured to be assembled from the bottom frame plate 11 and the side frame plate 312 as described above, the receiving jig is set such that it partially comes into close contact with a required forming portion WP of the adherend using the opening shaping parts WP of the adherend W.

Figure 2A:
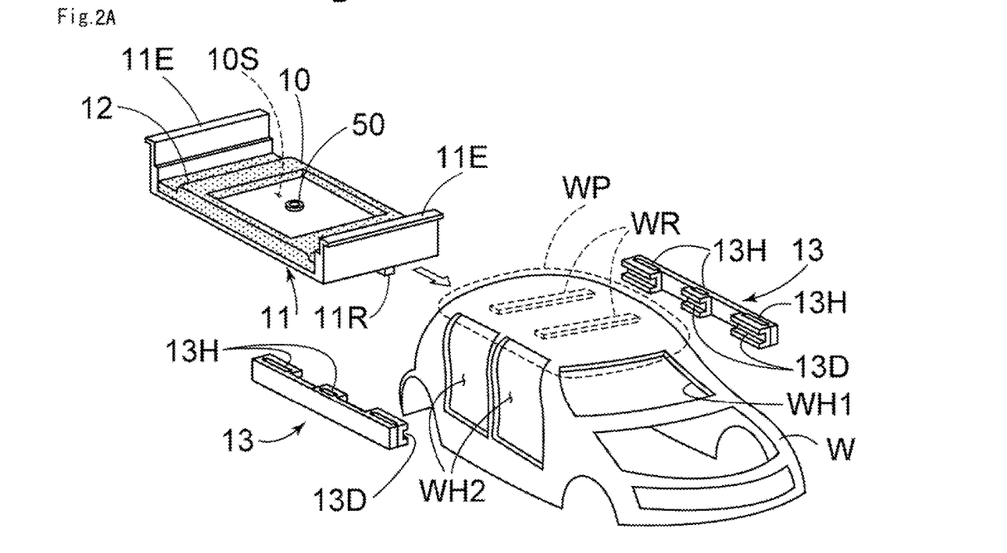
FIG. 2A is a perspective view explaining the first state before the first set state (SA) in the partial vacuum forming method of the first embodiment.
Figure 2B:
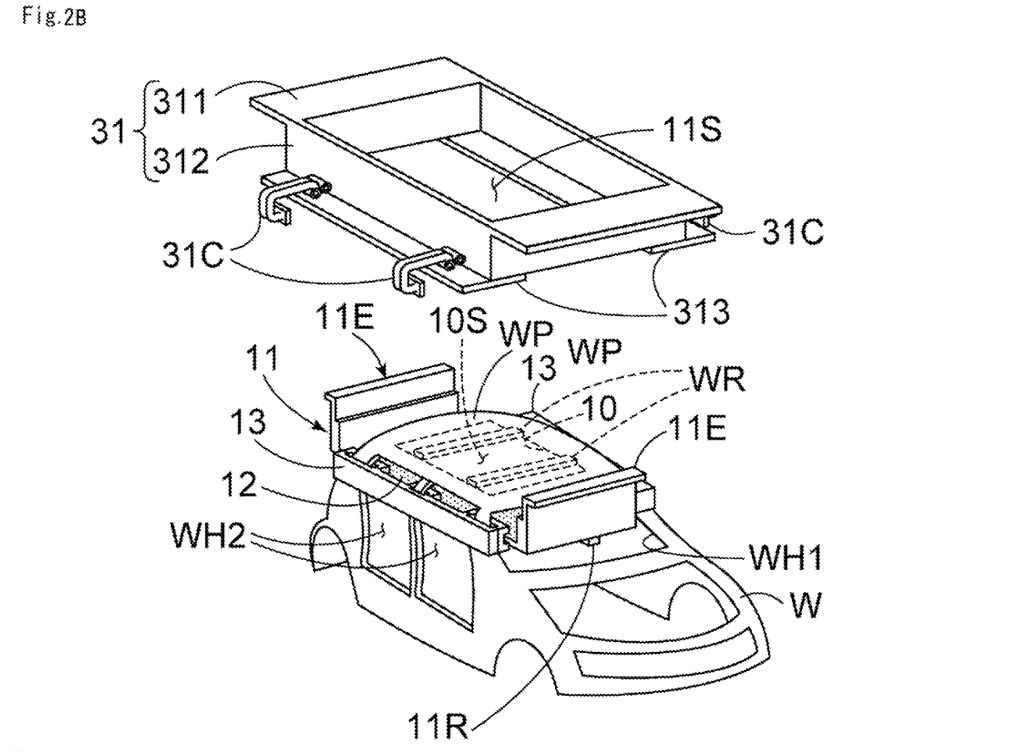
FIG. 2B is a perspective view explaining the second state before the first set state (SA) in the partial vacuum forming method of the first embodiment.
Figure 2C:
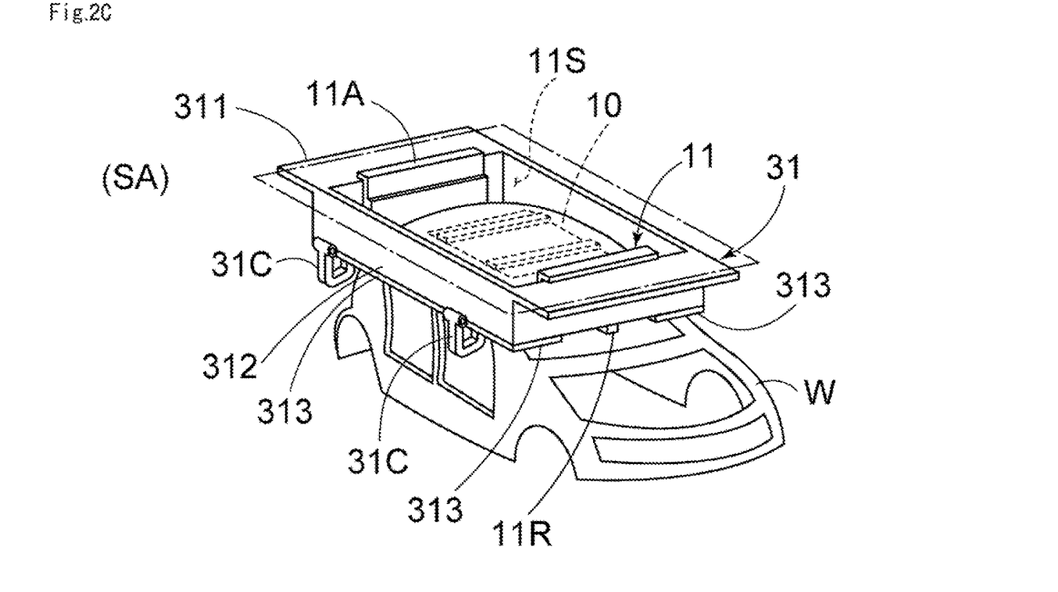
FIG. 2C is a perspective view explaining the third state before the first set state (SA) in the partial vacuum forming method of the first embodiment.
Figure 4:
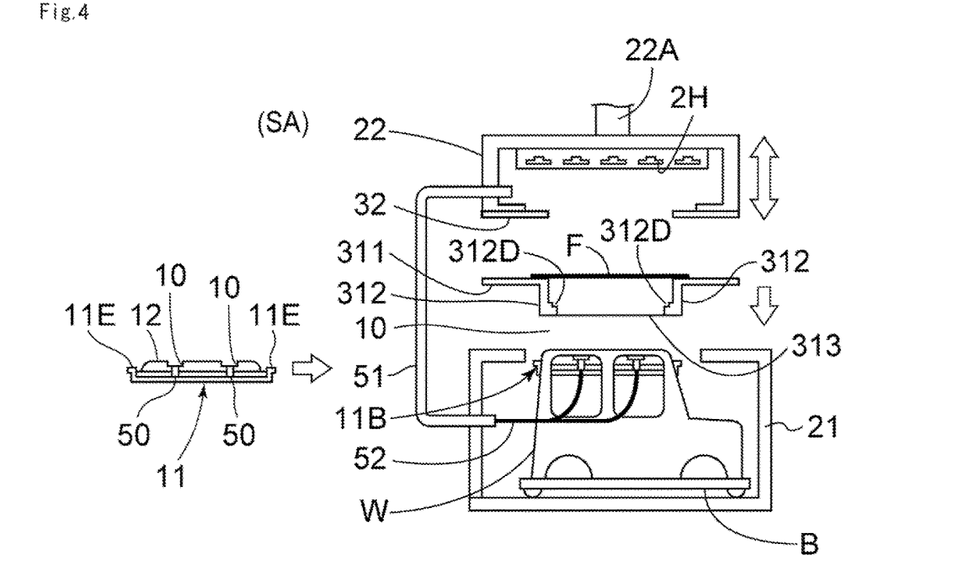
FIG. 4 is a side view explaining a state before the first set state (SA) in the partial vacuum forming method of a second embodiment.

In a first embodiment described later, a pair of parallel sides out of a four side periphery of the bottom frame plate 11 in plan view has rising parts 11E running along the inside of the side frame plate 312. Further, upper rising ends of the rising parts 11E have outwardly bent pieces (FIG. 2A, for example). The rising parts 11E are disposed along the inside of the side frame plate 312 integral with the lower frame 31 and the bent pieces are fixed by being caught on upper surface of the lower frame, so that the bottom frame plate 11 and the side frame plate 312 are joined together (FIG. 2C). The second embodiment described later shows a step-like assembling structure in which thin plate parts 11B at ends of the side frame plate 11 are fit into steps 312D of the side frame plate 312 and the bottom frame plate 11 is positioned at the lower end of the frame of the side frame plates 312 (FIG. 4).

(3) The present invention provides a partial vacuum forming method by partial overlay of a decorative film, the method including vertically joining an accommodating chamber 21 having an upper opening box space to an upper box 22 having a lower opening box space to sealingly form a forming space in which the box spaces are coupled together, and pressure-controlling the forming space to bring, under reduced pressure, the decorative film F into close contact with a surface of a part of an adherend W accommodated in the forming space.

The method includes:

a receiving jig (including a bottom frame plate 11 and a side frame plate 312) including a recessed body enclosing a predetermined forming portion WP which is a part of an adherend W from the inside of the portion to the side periphery, the receiving jig having a receiving mold with an upper end opening along an upper opening edge of an accommodating chamber 21;

the accommodating chamber 21 configured to, in a state where the adherend W is accommodated in the box space, position the receiving jig enclosing the predetermined forming portion WP of the adherend W in proximity to an upper opening;

an upper box 22 positioned above a space above the accommodating chamber 21 so as to be movable upward and downward, and in its downward-most position, the upper box being assembled by bringing a lower opening of the box space into contact with the upper opening of the accommodating chamber 21 with a decorative film F sandwiched therebetween;

a lower frame 31 having a four-side frame plate attached along the opening of the accommodating chamber 21 and fixing the receiving jig at a lower part of the lower frame by attaching an upper end of the receiving jig along a lower inner edge of a forming frame;

an upper frame 32 having a four-side frame plate attached along the opening of the upper box 22 and being able to come into contact with an upper surface of the lower frame 31; and pressure controlling means pressure controlling the upper space 22S in the upper box 22 and a lower space 11S in the receiving jig positioned and fixed in the accommodating chamber 21.

The method undergoes:

the second set state (SB1) in which the adherend W and the receiving jig enclosing a part of the predetermined forming portion WP of the adherend W are accommodated into the accommodating space, the receiving jig is fixed by bringing an upper end of the receiving jig into contact with the lower frame having an open top, and the decorative film F sized to cover the entire openings is positioned between the accommodating chamber 21 and the upper box 22;

the second set state (SB1) in which, following the second set state (SB1), the lower frame 31 of the accommodating chamber 21 and the upper frame 32 in contact with the upper box 22 sandwich the decorative film F, an arm 22A moves the upper box 22 downward until the frames 31 and 32 are in press contact with each other, and thus the decorative film F seals the lower opening of the upper box 22 and the upper end of the receiving mold of the receiving jig;

the first reduced pressure state (SB2) in which, following the second set state (SB1), each of the upper box 22 and the inside of the receiving jig enclosing a part of the adherend W in the accommodating chamber 21 are pressure-reduced by the pressure regulating means; and the second reduced pressure state (SC) in which, following the first reduced pressure state (SB2), the upper box 22 is pressure-released while the accommodating chamber 21 is pressure-reduced with the pressure regulating means to bring the decorative film F into close contact with the predetermined forming portion WP of the adherend W enclosed by the receiving jig in the receiving jig, and thus only the predetermined forming portion WP of the adherend W is partially overlay formed.

(4) Preferably, the adherend W is formed in three dimensions with a plurality of opening shaping parts by a 3D-contour plate, and in the entire adherend W, a projecting portion which projects outward beyond an edge of any of the opening shaping parts is decoratively (overlay) formed as the predetermined forming portion WP, the receiving jig has a hollow forming mold 12 which projects three-dimensionally in accordance with a three-dimensional shape of the projecting portion on the recessed bottom of the body, in the second set state (SB1) where the receiving jig encloses the predetermined forming portion WP entirely in the recessed shape, the forming mold 12 comes into contact with the rear side of the predetermined forming portion WP, and the upper opening 10 in the hollow forming mold 12 is in piping communication with the upper box 22 by a communication pipe 5, thereby maintaining pressure in the hollow space 10S between the upper opening and the forming portion WP at the same pressure state as that of the upper space. This constitutes an equal pressure pathway in which pressure in the hollow space 10S follows the same pressure state as that of the upper space 22S in the upper box 22. Thus, the hollow space 10S is pressure-reduced together with the upper box 22 in the first reduced pressure state (SB2), and also, the hollow space 10S is pressure-released together with the upper box 22 in the second reduced pressure state (SC).

(5) Preferably, an outside body space S21 in the accommodating chamber 21 partitioned by the receiving jig includes pressurizing and air cleaning means having a pair of chambers C11 and C12 formed at a place from which the accommodating chamber 21 separates, such that the chambers communicate with each other, a communication pipe C2 circulating through and communicating with the chambers C11 and C12, air blowing means C3 sending fresh air into the communication pipe, and filters 211F, 212F, and C4 removing dust in the communication pipe, and with the pressurizing and air cleaning means, the accommodating space 21S in the first reduced pressure state (SB2) or formed state SD is always filled with pressurized circulating air.

Figure 3:
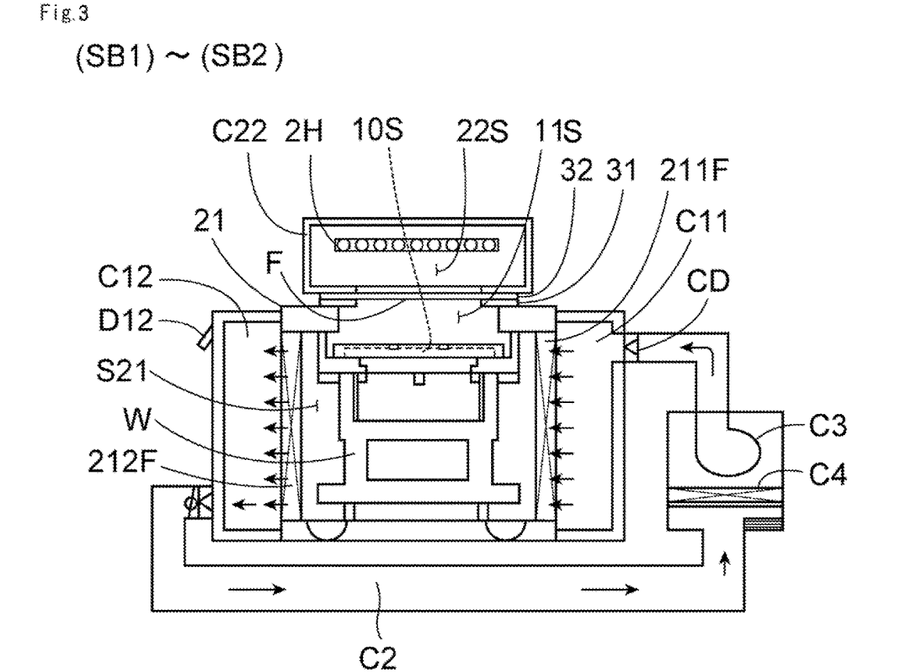
FIG. 3 is a front view explaining a configuration of pressurizing and air cleaning means in the lower drawing of FIG. 1A (the second set state (SB1) to the first reduced pressure state (SB2) (SB2)).

As shown in FIG. 3, each of both sides of the accommodating chamber 21 is a wind blowing chamber C11 and a wind receiving chamber C12 and the piping is arranged to connect the chambers C11 and C12 outside the chamber 21 via the filters 211F, 212F, and C4 for air to pass therethrough. This allows the decorative film to be overlaid while a desired cleanness in the accommodating chamber 21 and the upper box (C22) is maintained. Decoratively forming under little influence of dust in the air prevents the mixing of impurities between the decorative film F and the adherend W.

Effects of the Invention

With the above measures, in the partial vacuum forming method in which the decorative film F is brought into close contact in the upper accommodating chamber 21 and forming the film under reduced pressure, by partitioning the accommodating chamber 21 into predetermined sections by the receiving jig and forming a forming space with the partitioned space and the upper box 22, overlay forming of a film can be performed in a relatively short time even if a large adherend W is used.

EMBODIMENTS OF THE INVENTION

Exemplary forms to carry out the present invention will be described hereinafter with reference to the process drawings of vacuum forming devices of the first and the second embodiments. Basically, in the partial vacuum forming method of the present invention, a vacuum forming machine is used which forms a coupled space where a receiving jig (including a bottom frame plate 11 and a side frame plate 312) and an upper box 22, which move toward and away from each other, are sealed vertically with a decorative film F sandwiched therebetween to bring the decorative film F into close contact with a surface of a forming portion WP, which is a part of an adherend W partially surrounded by the receiving jig, for forming.

In all embodiments, the present invention provides a partial vacuum forming method by partial overlay of a decorative film F, the method including: vertically joining the receiving jig having an upper opening lower space 11S to the upper box 22 having a lower opening upper space 22S to sealingly form a coupled space in which the spaces are coupled together with the decorative film F sandwiched therebetween and then pressure controlling the upper and the lower spaces forming the coupled space to bring, under reduced pressure, the decorative film F into close contact with a surface of a part of the adherend W accommodated in one of the upper and the lower spaces.

The device for partially overlay forming the decorative film F includes:

a receiving jig (including a bottom frame plate 11 and a side frame plate 312) including a recessed body enclosing a predetermined forming portion WP which is a part of an adherend W from the inside of the portion to the side periphery, the receiving jig having a receiving mold with an upper end opening along an upper opening edge of an accommodating chamber 21;

the accommodating chamber 21 configured to, in a state where the adherend W is accommodated in the box space, position the receiving jig enclosing the predetermined forming portion WP of the adherend W in proximity to an upper opening;

an upper box 22 positioned above a space above the accommodating chamber 21 so as to be movable upward and downward, and in its downward-most position, the upper box being assembled by bringing a lower opening of the box space into contact with a upper opening of the accommodating chamber 21 with a decorative film F sandwiched therebetween;

a lower frame 31 having a four-side frame plate attached along the opening of the accommodating chamber 21 and fixing the receiving jig at a lower part of the lower frame by attaching an upper end of the receiving jig along a lower inner edge of a forming frame;

an upper frame 32 having a four-side frame plate attached along the opening of the upper box 22 and being able to come into contact with an upper surface of the lower frame 31; and pressure controlling means pressure controlling the upper space 22S in the upper box 22 and a lower space 11S in the receiving jig positioned and fixed in the accommodating chamber 21.

The forming method by partial overly of the present invention is performed through the states described below.
In the entire adherend W having a plurality of opening shaping parts WH, a projecting portion which projects outward beyond an edge of any of the opening shaping parts is defined as the predetermined forming portion WP. Frames between the opening molding parts WH of the forming portion WP are surrounded with filling frames 13 having surrounding holes 13H to seal and fill around the frames, thereby achieving the first state (FIG. 2A).
In the entire adherend W in the first state, a projecting portion which projects outward beyond an edge of any of the opening shaping parts WH is defined as the predetermined forming portion WP. A bottom plate frame 11 is inserted between opening shaping parts WH so that the bottom plate frame 11 partitions the forming portion WP, and rising parts 11E at front and rear ends of the bottom plate frame are made to project forward and backward, respectively, thereby achieving the second state (FIG. 2B).

A lower frame 31 having a side frame plate 312 is moved downward from above the bottom plate frame 11 having both ends projecting forward and backward of the entire adherend W in the second state, and fitted with outer surfaces of the rising parts 11E of the bottom plate frame 11. Then, bottom cover plates 313 horizontally slidably attached to the underside of the side frame plate 312 are slid inwardly to assemble the side frame plate 11 and the side frame plate 312 into a shape of a body having a sealed recessed part, thereby achieving the third state (FIG. 2C). Fixing hooks 31C pressing the bottom cover plates 313 from below for keeping the assembled state is attached to outer surfaces of a pair of right and left plates of the side frame plate 312. The third state is maintained by operating the fixing hooks 31C and pressing the bottom cover plates 313.

An upper end of the receiving jig enclosing a part of the predetermined forming portion WP of the adherend W is made to come into contact with the lower frame 31 having an open top. The receiving jig surrounding the forming portion WP is joined to the lower frame 31 as a recessed receiving tool, thereby achieving the third state (FIG. 2C). The receiving jig and the lower frame 31 in the third state are accommodated into an accommodating space in the accommodating chamber 21 together with the adherend W. Then, the decorative film F sized to cover the entire openings is positioned between the receiving jig, and also the accommodating chamber 21 and the upper box 22, thereby achieving the first set state (SA) (FIG. 1A or FIG. 4).

Following the first set state (SA), upper and lower surfaces of the decorative film F are sandwiched by the lower frame 31 in contact with the accommodating chamber 21 and the upper frame 32 in contact with the upper box 22. The upper box 22 is moved downward by an arm 22A until the upper frame 32 press contacts with the lower frame 31. Thus the lower opening of the upper box 22 and also the upper end of the receiving mold of the receiving jig are sealed with the decorative film F, thereby achieving the second set state (SB1) (lower drawing of FIG. 1A).

Figure 1A:
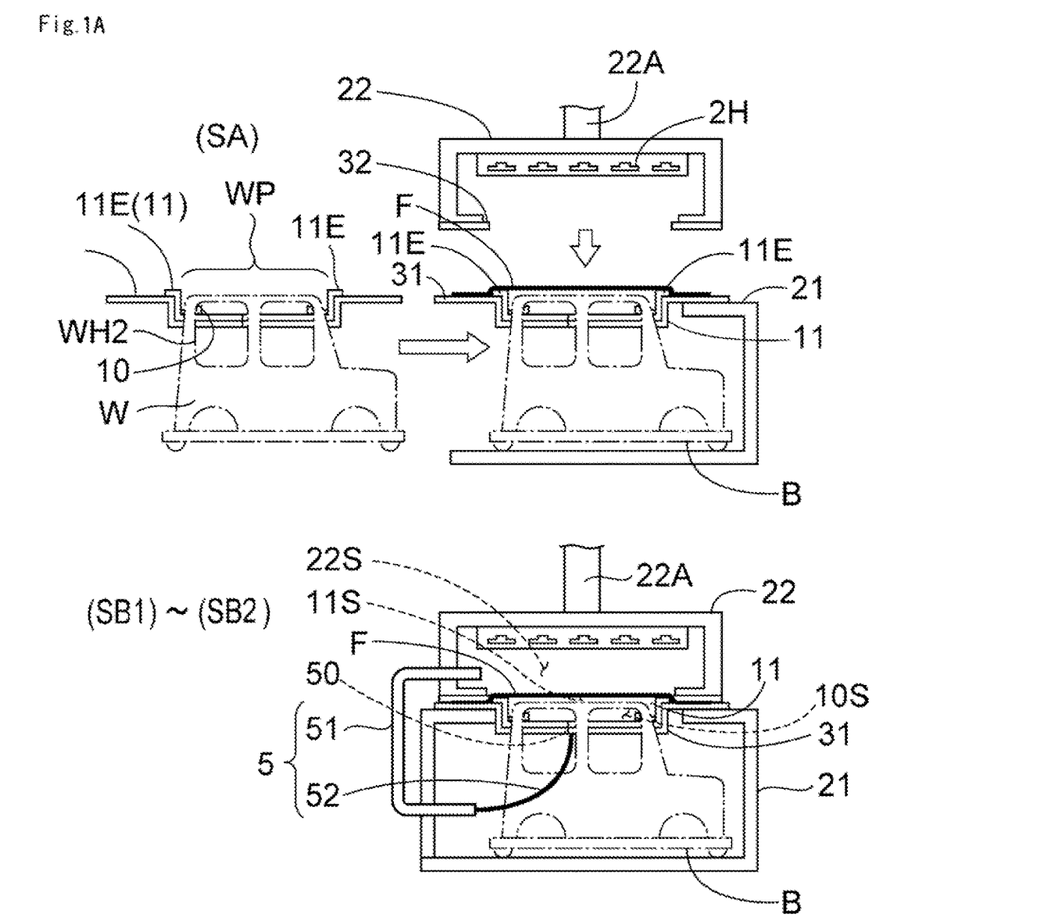
FIG. 1A is side views explaining the first set state (SA) and the second set state (SB1) in a partial vacuum forming method of a first embodiment.

Following the second set state (SB1), the upper space 22S in the upper box 22 and the lower space 11S above the forming portion WP surrounded by the receiving jig (11 and 312) are each pressure-reduced with pressure regulating means controlling pressures in the upper box 21 and in the receiving jig to be reduced or released separately, thereby achieving the first reduced pressure state (SB2) (lower drawing of FIG. 1A).

Figure 1B:
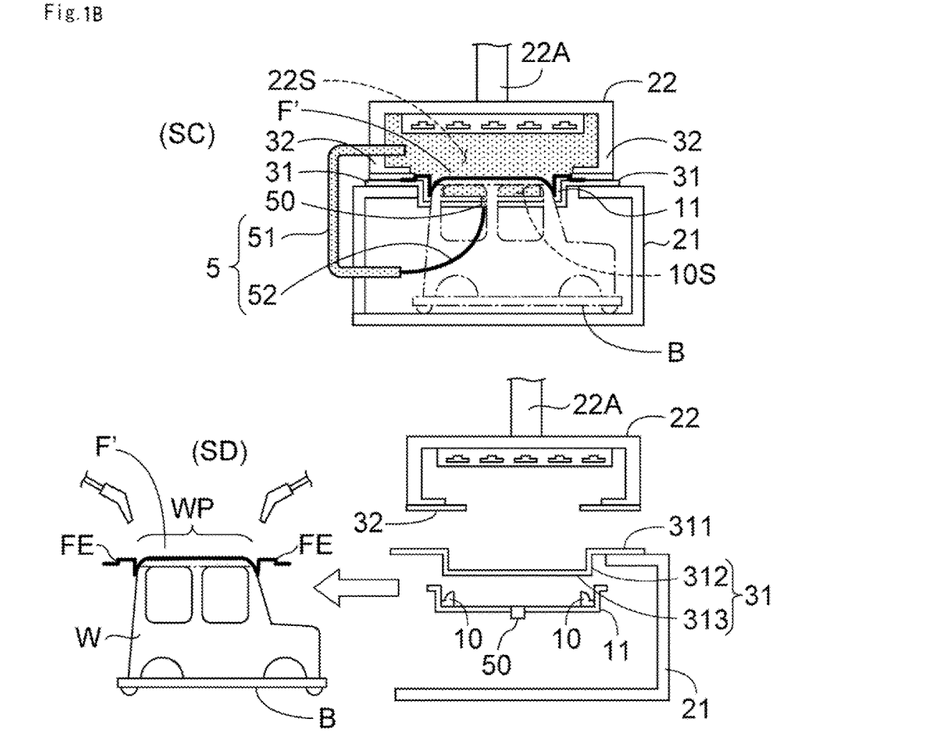
FIG. 1B is side views explaining the second reduced pressure state (SC), and a taken out state (SD) in the partial vacuum forming method of the first embodiment.

Following the first reduced pressure state (SB2), the upper space 22S in the upper box 22 is pressure-released while the lower space 11S is pressure-reduced with the pressure regulating means. Then, the decorative film F is brought into close contact only with the predetermined forming portion WP of the adherend W surrounded by the receiving jig in the receiving jig. Accordingly, the predetermined forming portion WP of the adherend W is partially overlay formed, thereby achieving the second reduced pressure state (SC) (upper drawing of FIG. 1B).

The receiving jig is removed from the adherend W in the second reduced pressure state (SC), and the adherend W is taken out of the accommodating box, thereby achieving the taken out state (SD). An extending film part FE other than an overlay film F' is removed with a laser cutter (lower drawing of FIG. 1B).

According to the partial vacuum forming method by partial overlay of a decorative film of the present invention, the method includes: sandwiching the decorative film F between the upper opening lower space and the lower opening upper space 22S to couple together upper and lower sealed spaces partitioned by the decorative film F; and instantaneously controlling each of the coupled upper and lower spaces so as to have a different pressure to bring the decorative film F into close contact with the predetermined forming portion accommodated in one of the spaces (the lower space 11S).

The method includes:

targeting the predetermined forming portion WP which is close to one end of the adherend W;

sealing and surrounding only the forming portion of the entire adherend W by a receiving jig having an upside open recessed part;

placing the upper box 22 having a downside open upper space on the opened upside of the receiving jig with the decorative film F sandwiched therebetween, and coupling the sealed space. Each configuration will be described later in detail.

(Receiving Jig)

The receiving jig includes a recessed body enclosing the predetermined forming portion WP which is a part of the adherend W from inside the portion to the side periphery, and an upper end of the receiving mold opens along the upper opening edge of the accommodating chamber 21. Specifically, the receiving jig is sealingly assembled from the bottom frame plate 11 and the side frame plate 312. As shown in FIG. 2A, the bottom frame plate 11 in the first embodiment includes a bent plate bent into a recessed shape in side view, in which front and back ends, or rising parts 11E, are raised to the same height as that of the side frame plate and the rising parts have extending pieces at their upper ends. The bottom frame plate 11 has on its surface a forming mold 12 which projects three-dimensionally in accordance with a three-dimensional shape of the projecting portion and is separated into front and back parts. In the second set state (SB1) where the receiving jig encloses the predetermined forming portion WP entirely in the recessed shape, the forming mold 12 comes into contact with the rear side of the predetermined forming portion WP. The forming mold 12 has a square upper opening 10 inside in plan view, and when set to the adherend W, sealingly constitutes an inner hollow space 10S under the adherend W and above the bottom frame plate 11. The upper opening 10 has a bottom hole 50 vertically penetrating the bottom frame plate in the opening. The bottom hole 50 is removably connected to an end part of a communication hose 52 connected to an end of an equal pressure communication pipe 51. In the second set state, the end part of the communication hose 52 is connected to the bottom hole 50, and the upper space 22S and the hollow space 10S maintain pressure conducting state via the pressure conducting communication pipe 51 and the communication hose 52. By undergoing the first and the second reduced pressure states while maintaining the state, when the upper space 22S is pressure-released, internal pressure of the hollow space 10S is released in a synchronized manner. Thus, even if there is a hollow rib WR on the rear side of the forming portion WP of the adherend W, the entire hollow rib WR is surrounded inside the hollow space 10S, and undergoes pressure synchronization, thereby preventing pressure deformation of a hollow part of the hollow rib WR.

(Rising Part 11E)

In the forming process, rising parts 11E are provided outside the peripheral of the adherend W having been set.

The rising parts 11E project beyond the highest part of the adherend W and toward the decorative film F. The rising parts 11E come into contact with the decorative film F before the adherend W to make frame contact with the film, that is, the rising parts push up the film at outside the peripheral of the adherend W to stretch it. Following the frame contact, the adherend W comes into close contact with the surface of the stretched decorative film F. In this case, because the rising frame is prepared outside the peripheral of the forming portion WP of the adherend W having been set, and the rising frame projects beyond the highest part of the adherend W and toward the decorative film F, when the decorative film F comes close to the adherend W, the rising frame comes into contact with the film before the adherend W, and thus pushes up the decorative film F at outside the peripheral of the adherend W to stretch it.

(Accommodating Chamber 21)

The accommodating chamber 21 can accommodate the entire adherend W in the internal accommodating space. The chamber accommodates the receiving jig enclosing the predetermined forming portion WP of the entire adherend W in the internal accommodating space S21 together with the adherend, and can position the receiving jig in proximity to the upper opening.

(Upper Box 22)

The upper box 22 has the upper space 22S as an internal space and also has a heater 2H provided therein, and is supported at the upper part by an arm 22A vertically moved by a pressure cylinder. The upper box 22 is positioned above the space above the accommodating chamber 21 by the arm 22 so as to be movable upward and downward. In its downward-most position, the upper box 22 is assembled by bringing the lower opening of the box space into contact with the upper opening of the accommodating chamber 21 with the decorative film F sandwiched therebetween.

(Lower Frame 31)

The lower frame 31 has a four-side frame plate attached along the opening of the accommodating chamber 21. The lower frame 31 fixes the receiving jig at a lower part of the lower frame by attaching the upper end of the receiving jig along a lower inner edge of the forming frame.

(Upper Frame 32)

The upper frame 32 has a four-side frame plate attached along an opening of the upper box 22 and is able to come into contact with the upper surface of the lower frame 31.

The upper space 22S in the upper box 22 and the lower space 11S in the receiving jig positioned and fixed in the accommodating chamber 21 is connected to pressure controlling means which pressure controls each space (not shown). The pressure controlling means can reduce pressure with a vacuum pump or release reduced internal pressure of each space to atmospheric pressure.

The adherend W is formed in three dimensions with a plurality of opening shaping parts WH by a 3D-contour plate. In the entire adherend W, a projecting portion which projects outward beyond an edge of any of the opening shaping parts WH is defined as the predetermined forming portion WP and is to be overlay formed. The receiving jig has the forming mold 12 which projects three-dimensionally in accordance with a three-dimensional shape of the projecting portion on the recessed bottom of the body. In the second set state (SB1) where the receiving jig encloses the predetermined forming portion WP entirely in the recessed shape, the forming mold 12 comes into contact with the rear side of the predetermined forming portion WP.

(Equal Pressure Pathway)

The upper opening 10 in the forming mold 12 is in piping communication with the upper box 22 from the opening bottom hole 50 by a communication pipe 5 to make an equal pressure pathway. The equal pressure pathway automatically controls pressure in the hollow space 10S between the upper opening and the forming portion WP to follow and maintain the same pressure state as that of the upper space. Thus, in the first reduced pressure state (SB2), the hollow space 10S is pressure-reduced together with the upper box 22, and also, in the second reduced pressure state (SC), the hollow space 10S is pressure-released together with the upper box 22.

The receiving jig can be assembled from the bottom frame plate 11 that can be inserted through the opening shaping parts of the adherend W and the side frame plate 312 joined to surround four sides of the bottom frame plate 1. Each face of the side frame plate 312 is assembled with a side of the bottom frame plate 11 inserted through the opening shaping parts of the adherend W, thereby achieving the second set state (SB1) where the receiving jig encloses the predetermined forming portion WP of the adherend W from the inside of the adherend W and the forming mold 12 comes into contact with the rear side of the predetermined forming portion WP.

(Pressurizing and Air Cleaning Means)

The outside body space S21 in the accommodating chamber 21 partitioned by the receiving jig includes pressurizing and air cleaning means having a pair of chambers C11 and C12 formed at a place from which the accommodating chamber 21 separates, such that the chambers communicate with each other, a communication pipe C2 circulating and communicating the chambers C11 and C12, air blowing means C3 sending fresh air into the communication pipe, and filters 211F, 212F, and C4 removing dust in the communication pipe (FIG. 3). With the pressurizing and air cleaning means, the accommodating space 21S in the first reduced pressure state (SB2) or formed state SD is always filled with pressurized circulating air.

(Pressure Regulating Process)

A pressure regulating process includes a pressure reducing step reducing pressure in each of the upper and lower forming spaces divided by the decorative film F placed over the adherend W and a pressurizing step pressurizing only the upper forming space after the pressure reducing step.

A heating process is a process in the former pressure reducing step, for heating the decorative film F from the upper forming space. A forming process is a process in the latter pressurizing step, for moving a table upward from the lower forming space and covering the adherend W with the decorative film F.

(Pressurizing and Cooling Process)

In a pressurizing and cooling process, cooling gas of a predetermined ejection volume is ejected through an ejection hole provided in the upper box 22 toward a substrate for vacuum forming machine and the adherend W in the forming space and also air of the volume equal to or less than the ejection volume of the cooling gas is discharged from the upper forming space through an outlet provided in the upper box 22 to the outside of the upper box 22, thereby cooling the substrate and the adherend W while maintaining the pressure in the upper forming space.

Particularly, it is preferable that the cooling gas is ejected through the ejection hole provided on any part of the inner surface of the upper box 22 in the direction toward the substrate for vacuum forming machine and the adherend W in the upper forming space, the outlet is provided on the inner surface of the upper box 22 in a region except the vicinity of the ejection hole or except the region to which the cooling gas is ejected, and the air is discharged through a position where cooling effect of the cooling gas ejection is not prevented.

The vacuum forming device of the present invention is provided with the heater 2H including a plurality of heating elements arranged in the upper box 22, and thus hardly affected by outside air.

The outside body space S21 in the accommodating chamber 21 partitioned by the receiving jig includes the pressurizing and air cleaning means having the pair of chambers C11 and C12 formed at a place from which the accommodating chamber 21 separates, such that the chambers communicate with each other, the communication pipe C2 circulating and communicating the chambers C11 and C12, the air blowing means C3 sending fresh air into the communication pipe, and the filters 211F, 212F, and C4 removing dust in the communication pipe.

With the pressurizing and air cleaning means, the accommodating space 21S in the first reduced pressure state (SB2) or formed state SD is always filled with pressurized circulating air. The second set state (SB1) is achieved while a predetermined clean state is maintained in the accommodating chamber 21 with the pressurizing and air cleaning means, enabling reliable partial overlay forming in which dust is hardly present between the forming portion WP and the decorative film.

In a forming device of a second embodiment shown in FIG. 4, a bottom frame plate 11 is a plate body with front and back ends made into thin steps 11E, and a bottom frame plate 11 has on its surface a forming mold 12 which projects three-dimensionally in accordance with a three-dimensional shape of a projecting portion. In the second set state (SB1) where the receiving jig encloses the predetermined forming portion WP entirely in the recessed shape, the forming mold 12 comes into contact with the rear side of a predetermined forming portion WP. An opening bottom hole 50 is adjacent to a bottom of each of two upper openings 10 and vertically penetrates the bottom frame plate. The other configurations and forming methods not particularly mentioned are the same as those in the first embodiment.

Besides, the present invention is not limited to the above-described embodiments and various modifications can be made, such as extraction of some elements, substitution with elements in other embodiments or alternatives, deletion, and superimposed combination of configurations from different embodiments, without departing from the gist of the invention.

DESCRIPTION OF REFERENCE SIGNS

22S: Upper space
F: Decorative film
WP: Forming portion
W: Adherend W
11: Bottom frame plate (receiving jig)
11S: Lower space
12: Forming mold
21: Accommodating chamber
21S: Accommodating space
22: Upper box 22
22A: Arm
31: Lower frame
32: Upper frame
(SA): First set state
(SB1): Second set state
(SB2): First reduced pressure state (SB2)
(SC): Second reduced pressure state
(SD): Taken out state
WH, WH1, WH2: Opening shaping part
50: Opening bottom hole
10: Upper opening
10S: Hollow space

The invention claimed is:

1. A partial vacuum forming method by partial overlay of a decorative film, including: sandwiching a decorative film between an upper opening lower space and a lower opening upper space to couple together upper and lower sealed spaces partitioned by the decorative film; and instantaneously controlling each of the coupled upper and lower spaces so as to have a different pressure to bring the decorative film into close contact with a predetermined forming portion accommodated in one of the spaces, the method comprising:
    targeting the predetermined forming portion which is close to one end of an adherend;
    sealing and surrounding only the forming portion of the adherend by a receiving jig having an upside open recessed part;
    placing an upper box having a downside open upper space on an opened upside of the receiving jig with the decorative film sandwiched therebetween;
    coupling the upper and lower sealed spaces;
    controlling the upper and lower spaces of each of the obtained coupled spaces so as to have a different pressure to partially overlay the decorative film; and
    vertically joining the receiving jig having the upper opening lower space to the upper box having the lower opening upper space to sealingly form the coupled space in which the spaces are coupled together with the decorative film sandwiched therebetween; and pressure-controlling each of the upper and the lower spaces constituting the coupled space to bring, under reduced pressure, the decorative film into close contact with a surface of a part of the adherend accommodated in one of the upper and the lower spaces,
    wherein the method further includes:
        a receiving jig including a recessed body enclosing a predetermined forming portion which is a part of an adherend from an inside of the portion to a side periphery, the receiving jig having a receiving mold with an upper end opening along an upper opening edge of an accommodating chamber;
        the accommodating chamber configured to, in a state where the adherend is accommodated in a box space, position the receiving jig enclosing, the predetermined forming portion of the adherend in proximity to an upper opening;
        an upper box positioned above a space above the accommodating chamber so as to be movable upward and downward, and in a downward-most position, the upper box being assembled by bringing a lower opening of a box space into contact with the upper opening of the accommodating chamber with a decorative film sandwiched therebetween;
        a lower frame having a four-side frame plate attached along the opening of the accommodating chamber and fixing the receiving jig at a lower part of the lower frame by attaching an upper end of the receiving jig along a lower inner edge of a forming frame;
        an upper frame having a four-side frame plate attached along the opening of the upper box and being able to come into contact with an upper surface of the lower frame; and pressure controlling means pressure controlling the upper space in the upper box and a lower space in the receiving jig positioned and fixed in the accommodating chamber, wherein the method undergoes:

the first set state in which the upper end of the receiving jig enclosing a part of the predetermined forming portion of the adherend is brought into contact with the lower frame having an open top, the receiving jig surrounding the forming portion is joined to the lower frame as a recessed receiving tool, the receiving jig and the lower frame in the state is accommodated into the accommodating space in the accommodating chamber together with the adherend, and the decorative film sized to cover the entire openings is positioned between the receiving jig and the upper box, the second set state in which, following the first set state, upper and lower surfaces of the decorative film are sandwiched by the lower frame in contact with the accommodating chamber and the upper frame in contact with the upper box, an arm moves the upper box downward until the upper frame and the lower frame are in press contact with each other, and thus the decorative film seals the lower opening of the upper box and the upper end of the receiving mold of the receiving jig, the first reduced pressure state in which, following the second set state, each of the upper space in the upper box and the lower space above the forming portion surrounded by the receiving jig is pressure-reduced with pressure regulating means controlling pressures in the upper box and the receiving jig to be reduced or released separately, and the second reduced pressure state in which, following the first reduced pressure state, the upper space in the upper box is pressure-released while the lower space is pressure-reduced with the pressure regulating means to bring the decorative film into close contact only with the predetermined forming portion of the adherend surrounded by the receiving jig in the receiving jig, and thus the predetermined forming portion of the adherend is partially overlay formed.

2. The partial vacuum forming method by partial overlay of a decorative film according to claim 1, wherein the receiving jig can be assembled from a bottom frame plate that can be inserted through a plurality of opening shaping parts of the adherend and a side frame plate joined to surround four sides of the bottom frame plate, and each face of the side frame plate is joined to a side of the bottom frame plate inserted through the opening shaping parts of the adherend, achieving the second set state (SB1) where the receiving jig encloses the predetermined forming portion of the adherend from an inside of the adherend and the forming mold comes into contact with a rear side of the forming portion.

3. The partial vacuum forming method by partial overlay of a decorative film according to claim 1, wherein the adherend is formed in three dimensions with the plurality of opening shaping parts by a 3D-contour plate, and in the entire adherend, a projecting portion which projects outward beyond an edge of any of the opening shaping pans is overlay formed as the predetermined forming portion, the receiving jig has a hollow forming mold which projects three-dimensionally in accordance with a three-dimensional shape of the projecting portion on a recessed bottom of the body, in the second set state where the receiving jig encloses the predetermined forming portion entirely in the recessed shape, the forming mold comes into contact with the rear side of the predetermined forming portion, and the upper opening in the hollow forming mold is in piping communication with the upper box from an opening bottom hole by a communication pipe, to maintain pressure in a hollow space between the upper opening and the forming portion at the same pressure state as that of the upper space.

4. The partial vacuum forming method by partial overlay of a decorative film according to claim 2, wherein the adherend is formed in three dimensions with the plurality of opening shaping parts by a 3D-contour plate, and in the entire adherend, a projecting portion which projects outward beyond an edge of any of the opening shaping parts is overlay formed as the predetermined forming portion, the receiving jig has a hollow forming mold which projects three-dimensionally in accordance with a three-dimensional shape of the projecting portion on a recessed bottom of the body, in the second set state where the receiving jig encloses the predetermined forming portion entirely in the recessed shape, the forming mold comes into contact with the rear side of the predetermined forming portion, and the upper opening in the hollow forming mold is in piping communication with the upper box from an opening bottom hole by a communication pipe, to maintain pressure in a hollow space between the upper opening and the forming portion at the same pressure state as that of the upper space.

* * * * *